(12) United States Patent
Joubert et al.

(10) Patent No.: US 6,689,467 B1
(45) Date of Patent: Feb. 10, 2004

(54) COMPOSITION COMPRISING AN INORGANIC COATING AND A CORE COMPRISING AT LEAST A POLYHYDROXYL COMPOUND

(75) Inventors: Daniel Joubert, Vineuil Saint Firmin (FR); Sylvaine Neveu, Paris (FR); Sophie Vaslin, Saint-Cloud (FR)

(73) Assignee: Rhodia Chimie, Courbevoie Cedex (FR)

( * ) Notice: Subject to any disclaimer, the term of this patent is extended or adjusted under 35 U.S.C. 154(b) by 0 days.

(21) Appl. No.: 09/869,053

(22) PCT Filed: Dec. 21, 1999

(86) PCT No.: PCT/FR99/03230

§ 371 (c)(1),
(2), (4) Date: Sep. 26, 2001

(87) PCT Pub. No.: WO00/38829

PCT Pub. Date: Jul. 6, 2000

(30) Foreign Application Priority Data

Dec. 23, 1998 (FR) ............................................. 98 16371

(51) Int. Cl.⁷ ................................................. B32B 5/16
(52) U.S. Cl. ....................... 428/403; 427/222; 427/322; 427/372.2
(58) Field of Search ........................ 428/403; 427/222, 427/322, 372.2

(56) References Cited

U.S. PATENT DOCUMENTS

| | | | | |
|---|---|---|---|---|
| 3,857,964 A | * | 12/1974 | Yolles | 426/3 |
| 3,928,252 A | * | 12/1975 | Rigler et al. | 426/573 |
| 4,192,756 A | * | 3/1980 | Mondshine | 252/8.55 R |
| 4,464,317 A | | 8/1984 | Thies et al. | |
| 5,658,609 A | * | 8/1997 | Abboud et al. | 426/609 |
| 5,718,969 A | * | 2/1998 | Sewall et al. | 428/304.4 |
| 6,242,099 B1 | * | 6/2001 | Grandmontagne et al. | 428/402.2 |
| 6,325,859 B1 | * | 12/2001 | De Roos | 131/276 |
| 6,436,461 B1 | * | 8/2002 | Bouwmeesters et al. | 426/575 |

FOREIGN PATENT DOCUMENTS

| | | |
|---|---|---|
| FR | 2 420 994 A | 10/1979 |
| GB | 720 318 A | 12/1954 |
| JP | 04 300646 A | 3/1993 |
| WO | WO 94/00405 A | 1/1994 |

* cited by examiner

Primary Examiner—H. Thi Le
(74) Attorney, Agent, or Firm—Burns, Doane, Swecker & Mathis, L.L.P.

(57) ABSTRACT

The invention concerns a composition comprising an inorganic coating and a core comprising at least a polyhydroxyl compound, the method for preparing this composition and it use.

33 Claims, No Drawings

COMPOSITION COMPRISING AN INORGANIC COATING AND A CORE COMPRISING AT LEAST A POLYHYDROXYL COMPOUND

CROSS-REFERENCE

This application is the National Stage of International Application No. PCT/FR99/03230, filed Dec. 21, 1999, which was published by the International Bureau in French on Jun. 6, 2000. This application claims priority to French Application No. 98/16371, field Dec. 23, 1998.

A subject matter of the present invention is a composition (C) comprising an inorganic shell (E) and a core comprising at least one polyhydroxylated compound (P), its process of preparation and its use.

In many technical fields, in particular in the farm-produce industry, attempts are being made to obtain compositions of "core-shell" type composed of a shell, within which at least one active material is immobilized or encapsulated.

In compositions of this type, the active material(s) can be isolated, definitively or temporarily, from their surrounding medium, in particular with the aim of protecting them and/or of delaying and/or controlling their release.

In the context of the present invention, the terms "controlled" release and "delayed" release can be defined in the following way:

the term "controlled" release means a release which can be triggered by a factor external to the system, which can also be referred to as the "trigger", such as the temperature, the pressure, and the like, this release being independent of the time; in other words, the choice is made of precisely at what moment and under what conditions it is desired for the release to take place;

the term "delayed" release means a release which takes place as a function of time with reasonably slow kinetics and without the involvement of external factors;

in other words, the release conditions are predetermined so that the release begins as soon as the "core-shell" composition is in the medium with reasonably fast kinetics, without it being possible to control the release a posterior.

These "core-shell" compositions are particularly advantageous when attempts are being made, for example, to mask the taste of an active material, to delay and/or control the thickening and/or gelling action of an active material or to preserve the structural and functional integrity of an active material.

Mention may be made, as an example illustrating the importance of this type of composition, of the encapsulation of dietary fiber.

It is now generally accepted in the minds of consumers that dietary fiber has nutritional properties and is of some advantage in the prevention of certain pathologies, in particular digestive abnormalities, abnormalities in the metabolism of lipids (hypocholesterolemic effect) and abnormalities in the metabolism of glucides (the case of diabetics).

Thus, their incorporation in foods in a sufficient amount makes it possible to increase the daily supply of fiber and thus to prevent the abovementioned pathologies.

Dietary fiber, which is composed of polyhydroxylated compounds, can be chosen, for example, from celluloses, hemicelluloses, pectins, guars, β-glucans, lignins or algal polysaccharides. Dietary fiber is naturally present in cereals, fruits and vegetables.

However, because of its nature, the incorporation of this fiber in an aqueous medium is not without disadvantage.

This is because, in an aqueous medium, some forms of soluble fiber, such as pectins or guars, already result, at low concentration, in solutions with high viscosities. Other forms of insoluble fiber, such as celluloses or β-glucans, form three-dimensional networks which swell considerably in an aqueous medium.

It is thus difficult, indeed even impossible, to incorporate sufficient amounts of fiber in food formulations without leading to a significant modification in the theological behavior of these formulations.

In such a case, recourse to "core-shell" compositions then seems essential.

When a temporary encapsulation of the active material is desired, the parameters which will result in the "destruction" of the shell and thus in the "release" of said active material into the medium must be determined prior to the encapsulation.

These parameters are determined mainly by the choice of the material constituting the shell. This choice is all the more important as, in the area of food, said material must satisfy certain requirements, in particular in terms of nontoxicity, of texture, of rheological properties, of organoleptic properties and of visual properties.

Furthermore, in some dietetic food formulations which are poor in lipids in particular, said material must be chosen so as not to increase the content of these undesirable compounds.

The materials frequently encountered in manufacturing the shell are proteins, fatty acids and gelling polysaccharides.

However, the disadvantage of these materials is that it is not easy to have a "controlled" release within the meaning defined above because, due to the chemical nature of these materials, it is not easy to precisely identify the external conditions for releasing the encapsulated active material.

An aim of the invention is to provide a composition of "core-shell" type in which, by virtue of predetermined parameters, the release and the diffusion of the active material can be controlled.

A further aim of the invention is to provide a composition of "core-shell" type which is easily dispersible in an aqueous medium and which can form stable solutions.

Another aim of the invention is to provide a composition of "core-shell" type in which the shell is composed of a material which satisfies the food requirements mentioned above.

Another aim of the invention is to provide a composition of the above type which makes it possible to incorporate sufficient amounts, from a nutritional viewpoint, of active material(s) and in particular of polyhydroxylated compounds into food formulations while preserving the satisfactory organoleptic properties of these formulations.

These aims and others are achieved by the present invention, a subject matter of which is a composition (C) comprising an inorganic shell (E) and a core comprising at least one polyhydroxylated compound (P).

Another subject matter of the invention relates to a process for the preparation of compositions (C) of the above type.

Another subject matter of the invention is the use of said compositions (C).

The first aspect of the present invention is a composition (C) comprising an inorganic shell (E) and a core comprising at least one polyhydroxylated compound (P).

The shell (E), which is one of the essential components of the compositions of the invention, is composed of an inorganic compound.

Mention may in particular be made, as inorganic compounds, of alkaline earth metal phosphates, alkaline earth metal carbonate or basic carbonate, transition metal basic carbonate, alkaline earth metal or transition metal sulfates, alkaline earth metal borates, alkaline earth metal halides, or their mixtures.

The alkaline earth metals are preferably chosen from magnesium and calcium.

The transition metals are advantageously chosen from aluminum and iron.

In the context of the invention, the halogen atoms can advantageously be chosen from bromine, chlorine and iodine.

Mention may in particular be made, as alkaline earth metal phosphates, of mono-, di- or tricalcium pyrophosphates, triphosphates or phosphates, or their mixtures.

The shell (E) can be composed of a single inorganic compound or of a mixture of inorganic compounds. In order to simplify the wording, the term "inorganic compound" will be used in the continuation of the account to denote both a single inorganic compound and a mixture of inorganic compounds.

The inorganic shell (E) represents an amount of between 10 and less than 100% by weight with respect to the total weight of the composition. It preferably represents an amount of between 20 and 80% by weight with respect to the total weight of the composition.

The core comprising at least one polyhydroxylated compound (P) constitutes the second essential component of the invention.

The polyhydroxylated compound (P) is advantageously a hydrocolloid.

According to a preferred embodiment of the invention, the polyhydroxylated compound (P) is a hydrocolloid capable of increasing the viscosity of the aqueous medium in which it is dissolved at a temperature of between 4 and 40° C.

According to a second preferred embodiment of the invention, the polyhydroxylated compound (P) is a hydrocolloid of above type which is soluble in an aqueous medium at a temperature of between 4 and 40° C.

Once released into the aqueous medium, the polyhydroxylated compound (P) of above type can result in a solution with a viscosity of between 10 and 7000 mPa·s. The viscosity can be determined with a rotational viscometer of Brookfield LVT 1 type.

Mention may be made, as polyhydroxylated compounds (P), of threose, erythrose, arabinose, xylose, ribose, deoxyribose, rhamnose, fucose, glucosamine, galactosamine, N-acetylglucosamine, N-acetylgalactosamine, araban, alginates, carrageenans, cellulose and its derivatives, chitosan, dextran, dextrin, fructosan, galactan, galactomannans, gum arabic, pectins, gum ghatti, galactoside, xanthan gum, glucan, glycan, glycogen, hemicellulose, hyaluronic acid, inulin, lamarinarin, levan, mannan, pentosan, polydextrose or xylan.

The polyhydroxylated compound (P) is chosen more particularly from guars, pectins, cellulose derivatives and β-glucans.

The core can comprise one polyhydroxylated compound (P) or a mixture of polyhydroxylated compounds (P).

In the continuation of the account, the term "polyhydroxylated compound" will be employed to denote both a single polyhydroxylated compound and a mixture of polyhydroxylated compounds.

The polyhydroxylated compound (P) is present in an amount of between 0 (but not including 0) and 90% by weight with respect to the total weight of the composition. The polyhydroxylated compound is preferably present in an amount of between 20 and 80% by weight with respect to the total weight of the composition.

According to one embodiment of the invention, the polyhydroxylated compound (P) can be partially substituted by a substance (S) chosen from flavorings, essential oils, colorants, film-forming substances, such as depolymerized guar or arabinoxylan, or substances which prevent the formation of foam, such as polyethoxylated oils derived from palm oil, soybean oil, castor oil, rapeseed oil, corn oil or sunflower oil.

In this embodiment, the contents of the core, namely the total amount of polyhydroxylated compound (P) and of substance (S), are between 0 (but not including 0) and less than 90% by weight with respect to the total weight of the composition. This amount is preferably between 20 and less than 80% by weight with respect to the total weight of the composition.

The compositions (C) according to the invention are advantageously provided in the form of solid particles. They preferably have a size of between 1 and 200 micrometers.

The controlled release of the contents of the core into the medium, as mentioned above, can be accomplished by the destruction of the shell.

This destruction can result in particular from the dissolution of the shell by variation in pH.

In the context of the invention, the shell (E) exhibits the advantage of being sensitive to pH.

Thus, the variation in pH necessary for the destruction of the shell (E) will depend on the nature of the constituent material of the shell.

Thus, the pH for destruction is less than 7. It is preferably less than 5 and more preferably less than 4.

In the compositions according to the invention, the inorganic shell (E) has the advantage of efficiently protecting the contents of the core, that is to say the polyhydroxylated compound (P) and, if appropriate, the substance (S), of conveying them into a given medium and, finally, of releasing them.

This phenomenon of release can be characterized, for example, by particle size measurements of the contents of the released core, of viscosity of medium, of the turbidity of the medium, and the like.

Another subject matter of the invention is the process for the preparation of the abovementioned compositions.

The process for the preparation of a composition (C) according to the invention is characterized in that:
(i) the polyhydroxylated compound (P) and optionally the substance (S) are dispersed in a medium which does not hydrate the polyhydroxylated compound,
(ii) the dispersion obtained in (i) is reacted with precursors of the constituent inorganic compounds of the shell (E) in the anhydrous or partially hydrated form and a precipitate is formed,
(iii) the precipitate is recovered and, if appropriate, is purified,
(iv) the precipitate obtained in (iii) is dried.

The term "medium which does not hydrate" is understood to mean a medium which does not dissolve (P). Without wishing to be restricted thereto, such a medium can be an aqueous medium comprising one or more alcohols, such as ethanol or isopropanol, alone or as a mixture, or an aqueous medium comprising a ketone, such as acetone.

The precursors of the constituent inorganic compounds of the shell (E) are chosen from two different families of inorganic compounds.

The first family of inorganic compounds corresponds to soluble alkali metal salts. They are more particularly chosen from alkali metal phosphates, [lacuna] metal carbonate or basic carbonate, or their mixtures.

The alkali metals are chosen from lithium, sodium or potassium.

The second family of inorganic compounds corresponds to soluble alkaline earth metal or transition metal salts. It are advantageously chosen from transition metal basic carbonate, alkaline earth metal or transition metal sulfates, alkaline earth metal borates, alkaline earth metal halides, or their mixtures.

The alkaline earth metals are preferably chosen from magnesium and calcium.

The transition metals are advantageously chosen from aluminum and iron.

In the context of the invention, the halogen atoms can advantageously be chosen from bromine, chlorine and iodine.

The best results are obtained when the compounds of the second family are in stoichiometric excess, for example at least 1.5 times, with respect to the compounds belonging to the first family.

The precursors are employed in solution in water or in an aqueous medium which dissolves them.

In stage (ii), a person skilled in the art will be in a position to determine the temperature and the pH which are favorable to the formation of the precipitate.

The precipitate can be recovered by any means known to a person skilled in the art, for example by filtration, centrifuging or separating by settling.

If appropriate, said precipitate can be purified by known methods. The conventional purification methods are washing/rinsing the filtration cake, either with water or with a suitable aqueous solution, until the soluble impurities, such as, for example, the residual salts, have been removed.

The stages of recovery and optionally of purification can be carried out several times.

Finally, the precipitate is dried using equipment for drying in a thin layer or in the divided state, such as the Duprat dryer, the fluidized bed or rotary dryers.

Another subject matter of the invention relates to the use of a composition (C) according to the invention in the field of food, cosmetics, detergency, pharmaceuticals or construction.

A more particular subject matter of the invention is the use of a composition (C) in the food field, in particular as adjuvant, in particular in energizing drinks, dietetic drinks, meal substitutes, and the like.

The compositions (C) of the invention have the advantage of being able to be used at concentrations greater than those of the prior art and more particularly greater than 10 g/l.

The following example illustrates the invention without, however, limiting its scope thereof.

EXAMPLE 1

Preparation of a Composition According to the Invention

A composition according to the invention was prepared according to the following process.
(a) Preparation of the Core
6 g of Meyproguar guar (Mw=$1.8 \times 10^6$ g/Mol) from Rhodia Food are dispersed with gentle stirring in 75 g of isopropanol from Prolabo.
(b) Formation of the Shell
13 g of purified water comprising 12 g of calcium chloride ($CaCl_2.2H_2O$) are added to the dispersion obtained in (i).

A solution comprising 2.5 g of sodium orthophosphate ($NaH_2PO_4.2H_2O$ from Prolabo) in 4.5 g of water is then added dropwise with gentle stirring. The duration of the introduction is approximately 15 minutes. A precipitate is then formed.

The pH of the solution is then of the order of 5.
(c) Recovery of the Composition (C)
The precipitate thus obtained is filtered through a sintered glass No. 4 filter and washed with a 20/80 water/propanol mixture.
(d) The Precipitate is Subsequently Dried Exposed to the Air in a Fluidized Bed.

The resulting composition exists in the form of solid particles with a size of 10 micrometers.

The particle size of the particles is determined with a laser particle sizer from Horiba.

Characterization of the Composition According to the Invention

In order to confirm the delay in the hydration of the encapsulated guar, the sample obtained by the process described above is dispersed in [lacuna] with moderate stirring using a deflocculating paddle [lacuna] 100 rev/min for 30 minutes and its viscosity is compared with that of the starting guar (Meyproguar) at the same concentration.

For the same concentration, a viscosity of 180 mPa·s was measured for a solution of starting guar (Meyproguar), whereas a solution of encapsulated guar only results in a viscosity of 25 mPa·s.

The viscosity is determined with a rotational viscometer of Brookfield LVT 1 type with a rotational speed of 6 rev/min.

The inorganic shell can be destroyed by addition of a few drops of hydrochloric acid in order to obtain a pH of 2.

The pH was measured using a pH meter of Schott Gerate GC 820 type.

The guar present in the core is thus released into the medium and results in a viscosity of the medium of the order of 180 mPa·s.

What is claimed is:

1. A composition (C) comprising an inorganic shell (E) and a core, wherein said core comprises at least one guar.

2. The composition of claim 1, wherein the inorganic shell (E) is an inorganic compound.

3. The composition of claim 1, wherein the inorganic shell (E) comprises an inorganic compound and wherein the inorganic compound is an alkali metal phosphate, an alkali metal carbonate or a basic carbonate, a transition metal basic carbonate, an alkaline earth metal or a transition metal sulfate, an alkaline earth metal borate or phosphate or carbonate or basic carbonate or an alkaline earth metal halide, or their mixtures.

4. The composition of claim 3, wherein the alkaline earth metal is magnesium or calcium.

5. The composition of claim 3, wherein the transition metal is aluminum or iron.

6. The composition of claim 3, wherein the halide is bromide, chloride or iodide.

7. The composition of claim 3, wherein the alkaline earth metal phosphate is a mono-, a di- or a tricalcium pyrophosphate, a triphosphate or a phosphate, or their mixtures.

8. The composition of claim 1, wherein the inorganic shell (E) is between 10 and less than 100% by weight with respect to the total weight of the composition.

9. The composition of claim 8, wherein the inorganic shell (E) is between 20 and 80% by weight with respect to the total weight of the composition.

10. The composition of claim 1, wherein the guar is present in an amount of between 0, but not including 0, and 90% by weight with respect to the total weight of the composition.

11. The composition of claim 10, wherein the guar is present in an amount of between 20 and 80% by weight with respect to the total weight of the composition.

12. The composition of claim 1, wherein the guar is partially substituted by a substance (S), wherein substance (S) is a flavoring, an essential oil, a colorant, a film-forming substance, or a substance which prevents the formation of foam.

13. The composition of claim 12, wherein the total amount of the guar and of substance (S) is between 0, but not including 0, and less than 90% by weight with respect to the total weight of the composition.

14. The composition of claim 13, wherein the total amount of the guar and of substance (S) is between 20 and less than 80% by weight with respect to the total weight of the composition.

15. The composition of claim 12, wherein the film-forming substance is a depolymerized guar or arabinoxylan.

16. The composition of claim 12, wherein the substance which prevents formation of foam is a polyethoxylated oil derived from palm oil, soybean oil, castor oil, rapeseed oil, corn oil or sunflower oil.

17. The composition of claim 1, wherein the composition is provided in the form of solid particles.

18. The composition of claim 1, wherein the composition comprises particles having a size of between 1 and 200 micrometers.

19. The composition of claim 1, wherein the dissolution of the shell (E) takes place at a pH of less than 7.

20. The composition of claim 1, wherein the dissolution of the shell (E) takes place at a pH of less than 5.

21. The composition of claim 20, wherein the pH is less than 4.

22. A process for preparing the composition (C) of claim 1, comprising:
   (i) dispersing the guar and optionally a substance (S) in a medium which does not hydrate the guar, the substance (S) comprising a flavoring, an essential oil, a colorant, a film-forming substance, or a substance which prevents the formation of foam.
   (ii) reacting the dispersion of step (i) with precursors of the constituent inorganic compounds of the shell (E) in the anhydrous or partially hydrated form forming a precipitate,
   (iii) recovering the precipitate and, optionally purifying the precipitate, and
   (iv) drying the precipitate obtained from step (iii).

23. The process of claim 22, wherein the precursors of the constituent inorganic compounds of the shell (E) are chosen from two different families of inorganic compounds.

24. The process of claim 23, wherein the first family of inorganic compounds is a soluble alkali metal salt.

25. The process of claim 24, wherein the alkali metal is lithium, sodium or potassium.

26. The process of claim 24, wherein the soluble alkali metal salt is an alkali metal phosphate, lacuna, a metal carbonate, or a basic carbonate, or their mixtures.

27. The process of claim 23, wherein the second family of inorganic compounds is a soluble alkaline earth metal or a transition metal salt.

28. The process of claim 27, wherein the alkaline earth metal is magnesium or calcium.

29. The process of claim 27, wherein the transition metal is aluminum or iron.

30. The process of claim 27, wherein the transition metal salt is a transition metal basic carbonate, an alkaline earth metal, a transition metal sulfate, an alkaline earth metal borate, an alkaline earth metal halide, or their mixtures.

31. The process of claim 23, wherein the inorganic compounds of shell (E) comprise a halogen atom and the halogen atom is bromine, chlorine or iodine.

32. The composition (C) of claim 1, wherein said composition (C) is a food, cosmetic, a detergent, a pharmaceutical or a construction material.

33. The composition (C) of claim 32, wherein said composition is food.

* * * * *